Sept. 27, 1960
A. P. PEPPLE
2,953,969
DEMONSTRATION MIRROR AND SUSPENDING
AND TILTING SYSTEM THEREFOR
Filed July 25, 1957
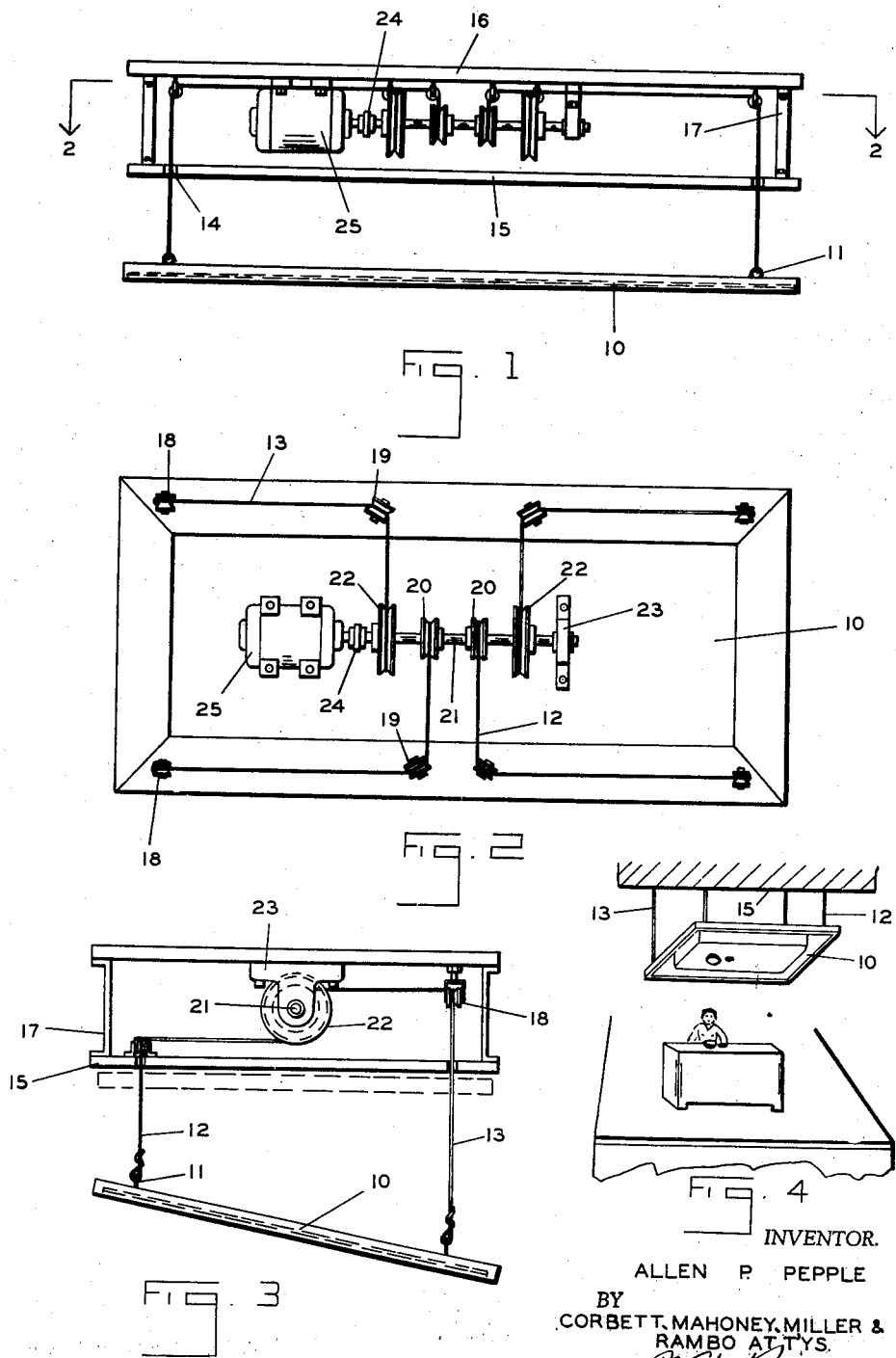
INVENTOR.
ALLEN P. PEPPLE
BY CORBETT, MAHONEY, MILLER & RAMBO ATTYS.

United States Patent Office 2,953,969
Patented Sept. 27, 1960

2,953,969

DEMONSTRATION MIRROR AND SUSPENDING AND TILTING SYSTEM THEREFOR

Allen P. Pepple, 1449 Grandview Ave., Columbus 12, Ohio

Filed July 25, 1957, Ser. No. 674,098

4 Claims. (Cl. 88—92)

This invention relates to a demonstration mirror and suspending and tilting systems therefor. It has to do, more particularly, with a demonstration mirror which will be suspended overhead at a demonstration spot so that an audience located in front of that spot can see the demonstration in the mirror, and to a remotely controlled suspension system which will move the mirror between a raised flat inoperative position and a lowered angular operative position.

A mirror of the general type indicated above is very desirable in connection with various demonstrations, such as in showing home economics demonstrations, for example, food preparation and the like, before a relatively large theater audience. It is desirable at such demonstrations to have a comparatively large reflecting mirror arranged above and behind the demonstrator so as to reflect a desired image to the audience who would otherwise be unable to follow the manipulations of the demonstrator which take place upon a relatively flat table surface, within bowls or pans, etc.

According to this invention, the mirror is suspended from the ceiling or other overhead support by means of flexible cables. The cables are reeved in a special manner so that the mirror can be lowered bodily from its uppermost horizontal position adjacent the ceiling and while being bodily lowered, will simultaneously be tilted.

In the accompanying drawing, the preferred embodiment of this invention is shown.

In this drawing:

Figure 1 is a front elevational view showing the lowered position of the mirror.

Figure 2 is a horizontal view taken along line 2—2 of Figure 1.

Figure 3 is an end view of the mirror and suspending system, showing by dotted lines the raised horizontal position and by full lines the lowered tilted position.

Figure 4 is a diagrammatic view showing the mirror lowered into tilted position and in use.

With reference to the drawing, in Figure 1 there is illustrated a large panel mirror of a suitable type which is indicated generally by the numeral 10. This mirror is suspended from its four corners by means of eyes 11 or other suitable cable-attaching members. The cables for suspending the mirror are divided into a forward pair consisting of the cables 12 and a rear pair consisting of the cables 13. Each of the cables passes upwardly through an opening 14 in the lower wall 15 of a suitable housing or casing. This housing also includes an upper wall 16 and the walls 15 and 16 are maintained in vertically spaced relationship by means of the spaces 17. The casing may be mounted within or on the ceiling or may be suitably attached to any other overhead supporting structure. Within the casing, each of the cables passes upwardly and then inwardly over an idler guide pulley 18 which is supported on the upper wall 16 and over an angularly disposed idler guide pulley 19 which is also supported by the wall 16.

Each cable 12 has its lower end anchored to one of the loops 11 at the forward edge of the mirror 10 and has its opposite end anchored to one of the pair of winding pulleys 20 both of which are supported on a common shaft 21. Each of the other cables 13 has one of its ends anchored by an eye 11 to the rear edge of the mirror 10 and has its opposite end anchored to one of the pair of winding pulleys 22 both of which are also coaxially supported on the common shaft 21 with the pulleys 20. The shaft 21 is mounted at one end in a suitable bearing 23 depending from the wall 16 and its opposite end is coupled at 24 to the drive shaft of an electric motor 25 which is supported on the wall 16. The motor 25 is of the reversible type and can be controlled from a remote location by a suitable switch connected thereto.

It will be apparent that each of the pulleys 22 is of greater diameter than each of the pulleys 20. Therefore, when the shaft 21 is driven, the pair of forward cables 12 will be reeved in or payed out to a lesser extent than the pair of rear cables 13. Consequently, by proper control of the motor 25, the mirror may be elevated to a substantially flat or flush horizontal position, closely adjacent the lower wall 15 which is usually flush with the ceiling structure of the room (dotted line position in Figure 3), or may be lowered bodily to an angularly inclined or tilted position (full line position in Figure 3) so as to facilitate viewing of any objects located below the mirror by an audience located forward of the mirror in the direction in which the mirror is tilted. The use of this arrangement is illustrated diagrammatically in Figure 4.

It will be apparent that this invention provides a particular cable-winding and reeving mechanism for supporting a mirror which includes a pair of cables attached to one edge of the mirror and a pair of cables attached to the opposite edge of the mirror, the cables being connected, respectively, to pairs of winding pulleys of different diameters so as to cause simultaneous vertical bodily and tilting movement of the mirror panel upon simultaneous rotation of the two pairs of winding pulleys.

Thus, there is provided a simple and inexpensive supporting structure for a mirror panel whereby the mirror can be moved from an inoperative flat horizontal upper position to an operative lower tilted position or in a reverse direction.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. Apparatus for facilitating the viewing of a demonstration by an audience in front of the demonstration location, comprising a mirror, a system for supporting the mirror above the demonstration location at different selected levels, said system comprising hoist means connected between the mirror and an adjacent fixed support for supporting the mirror in a raised inoperative substantially horizontal position at an upper level and for lowering it into an operative position at a lower level while simultaneously tilting it forwardly relative to said support with its rear edge lower than its forward edge to facilitate viewing of the demonstration by an audience from the forward direction in which the mirror is tilted, said hoist means comprising a set of suspending cables connected adjacent one edge of the mirror and a set of suspending cables connected adjacent the opposite edge of the mirror, and means for simultaneously winding both sets of cables but at unequal linear rates so as to cause simultaneous bodily vertical movement and tilting movement of the mirror.

2. Apparatus according to claim 1 in which said hoist means includes two pairs of suspending cables, one pair having one end of each of its cables attached adjacent one edge of the mirror and the other pair having one end of each of its cables attached adjacent the other edge of the mirror, the opposite end of each of the suspending cables of a pair being anchored to a winding pulley, the pulleys for one pair of cables being of identical diameter but being of different diameter from the pulleys of the other pair of cables and being driven at the same speed.

3. Apparatus according to claim 2 wherein all the pulleys are mounted on a common driven shaft.

4. Apparatus for facilitating the viewing of a demonstration by an audience in front of the demonstration location comprising a mirror, a cable reeving hoist system connected between the mirror and an adjacent overhead fixed support for supporting the mirror above the demonstration location at different selected levels, said cable reeving hoist system comprising flexible cables connected to the mirror and reeved around pulleys of different diameters so that rotation of the pulleys will lower the mirror bodily from an inoperative raised flat horizontal position at an upper level to a lowered operative position at a lower level while simultaneously tilting the mirror forwardly relative to said overhead fixed support with its rear edge lower than its forward edge to facilitate viewing of the demonstration by an audience from the forward direction in which the mirror is tilted.

References Cited in the file of this patent
UNITED STATES PATENTS

| | | |
|---|---|---|
| 379,693 | Fitchit | Mar. 20, 1888 |
| 2,133,978 | Draeger | Oct. 25, 1938 |
| 2,484,505 | Hansel | Oct. 11, 1949 |
| 2,609,170 | Farrington et al. | Sept. 2, 1952 |
| 2,707,053 | Browning | Apr. 26, 1955 |
| 2,811,262 | Schaitberger | Oct. 29, 1957 |